July 7, 1959 V. SCHAFER, JR 2,893,371
EXPANSION JOINT
Filed April 2, 1957 3 Sheets-Sheet 1
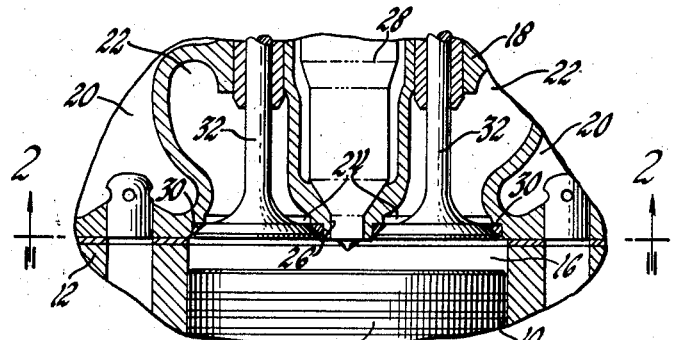
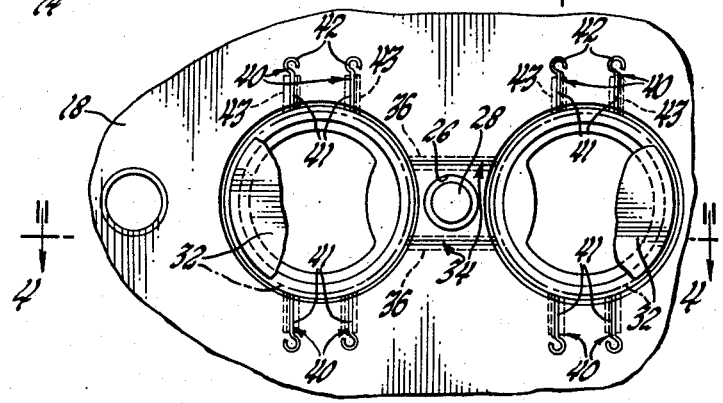
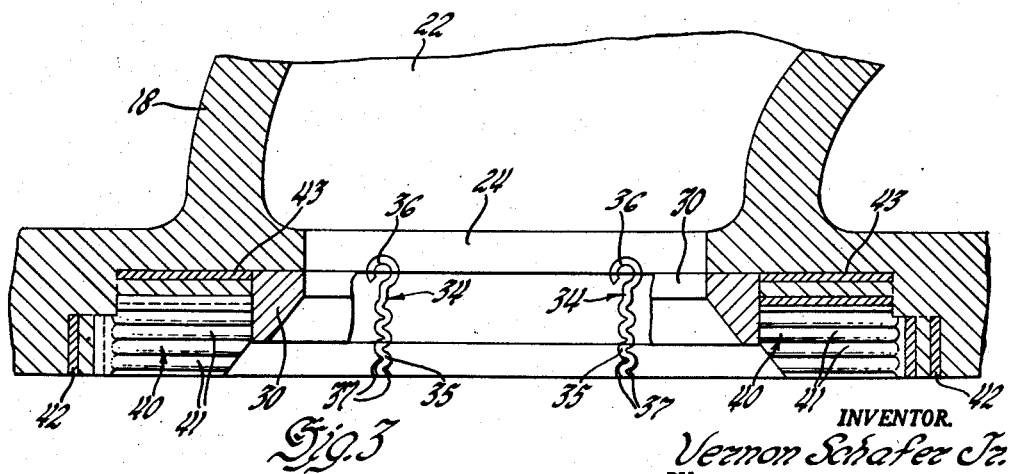
INVENTOR.
Vernon Schafer Jr.
BY
J. C. Thorpe
ATTORNEY July 7, 1959 V. SCHAFER, JR 2,893,371
EXPANSION JOINT
Filed April 2, 1957 3 Sheets-Sheet 2
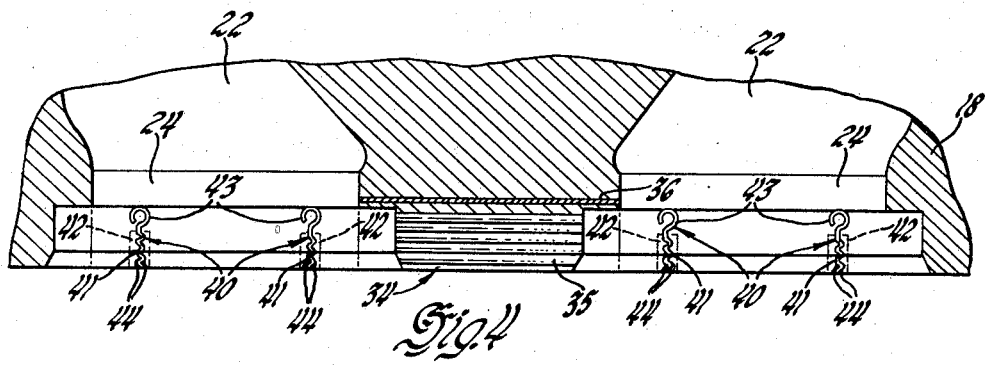
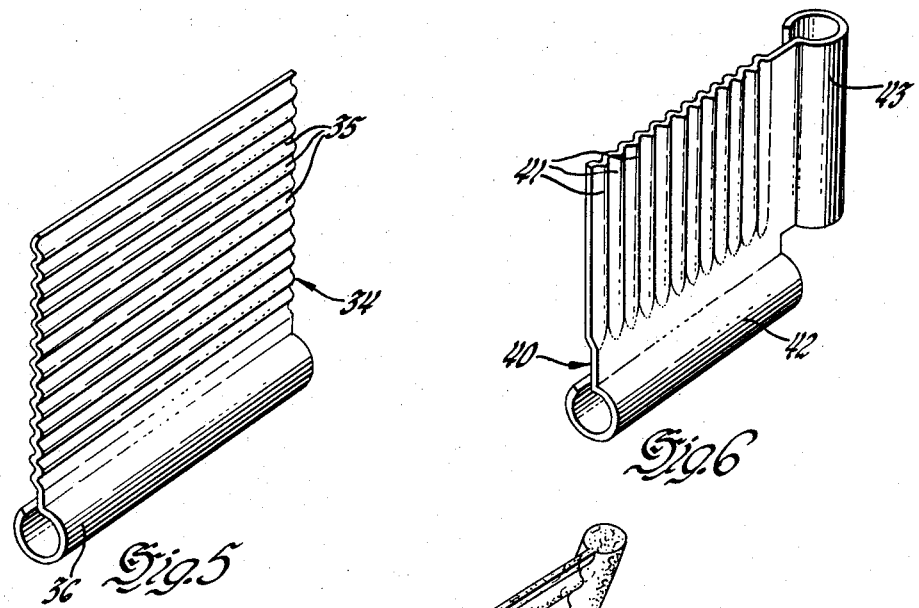
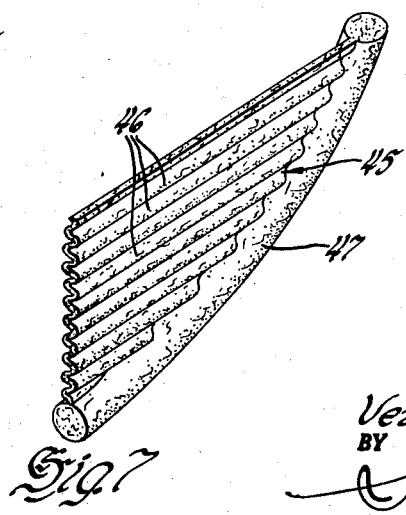
INVENTOR.
Vernon Schafer Jr.
BY
S. C. Thorpe
ATTORNEY July 7, 1959  V. SCHAFER, JR  2,893,371
EXPANSION JOINT
Filed April 2, 1957  3 Sheets-Sheet 3
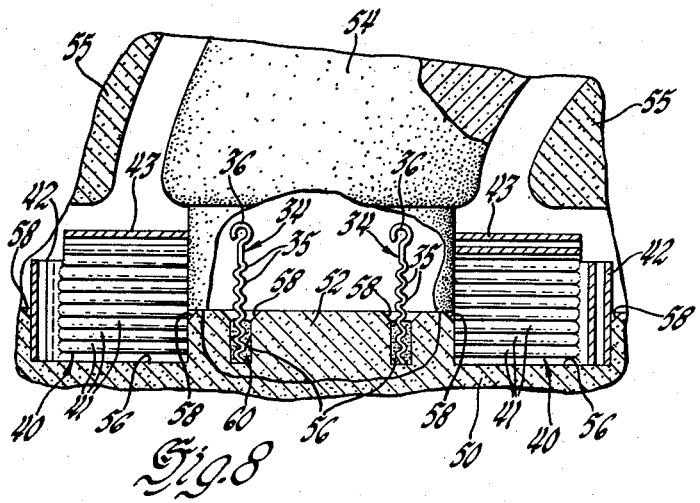
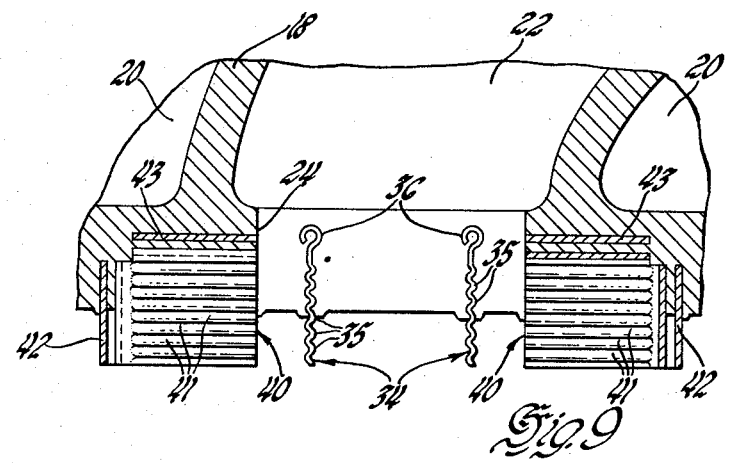
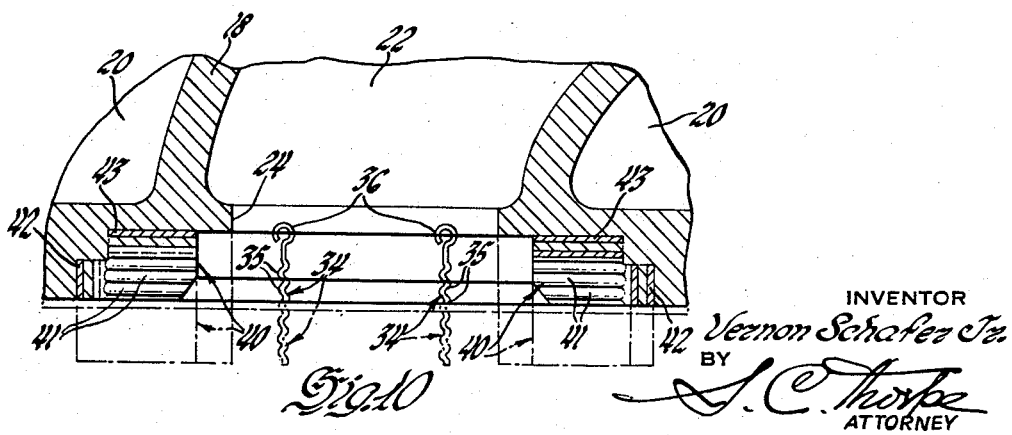
INVENTOR
Vernon Schafer Jr.
BY
J. C. Thorpe
ATTORNEY

UNITED STATES PATENT OFFICE

2,893,371

EXPANSION JOINT

Vernon Schafer, Jr., Livonia, Mich., assignor to General Motors Corporation, Detroit, Mich., a corporation of Delaware Application April 2, 1957, Serial No. 650,249

17 Claims. (Cl. 123—188)

This invention relates to an expansion joint for a member of a thermal device having a limited surface portion thereon subjected to rapid and extreme cyclic changes of surface temperature thereby subjecting said surface portion to severe cyclic thermal expansive and contractive conditions relative to the other surface and interior portions of the member and has particular application to internal combustion engines and the like.

The various surfaces defining a combustion chamber or cylinder of an internal combustion engine are subjected to rather severe cyclic thermal conditions due to the extremely rapid changes in temperature alternately imposed on these surfaces by the heats of compression and combustion and by the flow of relatively cool gaseous charges into the cylinders during the engine operating cycle. These changes in surface temperature result in the cyclic imposition of expansive compressive and contractive tensive stresses on these surfaces and the immediately adjacent layers of the various cylinder-defining members. In time these cyclic stresses result in fatigue cracking of these surfaces. Such cracking generally occurs intermediate and adjacent ports or openings in such members where the surface layer subjected to such cyclic stressing is of reduced dimension. Such cracking is also particularly prevalent in those applications where the engine is subjected to excessive fluctuations in load and speed; factors which result in sudden applications of relatively cool incoming air onto overheated cylinder-defining surfaces.

This invention contemplates providing the combustion chamber surfaces of a thermal device of the type described with expansion joints similar in function to those provided by the shallow grooves shown and described in United States Patent No. 2,791,989, issued to John Dickson and entitled "Internal Combustion Engine." In accordance with the invention, such expansion joints are formed by casting inserts of nonfusible material into the cylinder-defining members adjacent critical areas. These inserts intersect the combustion chamber surface and extend through the layer of the member normally subjected to such cyclic expansive and contractive thermal conditions. Under engine operating conditions the initial expansive compression imposed on this surface layer stresses this layer beyond its compressive yield point for the temperatures involved and effects the formation of grooves immediately adjacent to and including the opposite sides of the insert. These grooves serve to accommodate and isolate subsequent expansion and contraction of the surface layer from the adjacent critical areas.

The foregoing and other objects, features, advantages and aspects of the invention will be apparent from the following detailed description having reference to the accompanying drawings illustrating several forms of the invention and in which:

Figure 1 is a fragmentary view of a cylinder for an internal combustion engine of the uniflow diesel type with parts thereof broken away and in longitudinal section to show the operational environment of the invention;

Figure 2 is a fragmentary view taken substantially on the line 2—2 of Figure 1 and shows a portion of the underside of the cylinder head in elevation;

Figure 3 is an enlarged fragmentary sectional view taken substantially on the line 3—3 of Figure 2;

Figure 4 is a view similar to Figure 3 and taken substantially on the line 4—4 of Figure 2;

Figure 5 is a perspective view of one form or insert shown in the embodiment of the invention of Figures 2–4;

Figure 6 is a perspective view of a second form of insert as used in the embodiment of the invention of Figures 2–4;

Figure 7 is a perspective view of a modified form of insert adapted for use in place of the insert shown by Figure 6; and Figures 8, 9 and 10 are views showing the method of casting and machining a cylinder head to include expansion joint inserts.

Referring more particularly to the drawings, Figure 1 shows a portion of a uniflow, two-cycle diesel engine in which a cylinder bore 10 in an engine block 12 reciprocably mounts a piston 14. The piston forms an expansible combustion chamber 16 with a cylinder head 18 secured to the engine block and closing the cylinder bore at its upper end. The cylinder head is cored to provide coolant passages 20 and two exhaust passages 22. The exhaust passages 22 terminate in two ports 24 opening on the combustion chamber or fire deck surface of the head in diametrically flanking relation to an opening 26 provided therein for the nozzle of a fuel injector 28. The exhaust ports 24 are counterbored to receive annular inserts 30 which are beveled to seat the heads of two exhaust valves 32 reciprocably mounted in the head.

As indicated above, the combustion chamber or fire deck surface of the cylinder head of such an engine is particularly susceptible to surface cracking intermediate and adjacent the valve ports and injector nozzle opening. The cracking which occurs intermediate the injector opening and the exhaust ports is generally in a diametrical plane common to the several openings. The expansion and contraction of the fire deck surface parallel to this common diametrical plane also tends to develop sunburst type cracking of the fire deck surface radially outwardly from the exhaust ports transversely of this common diametrical plane. After such cracks are initiated in the fire deck, they tend to progress through the fire deck and in time may result in the leakage of coolant into the combustion chamber. Such cracking and the subsequent cyclic expansion and contraction of the adjacent combustion chamber surfaces also result in the ovalizing of the injector and valve seating surfaces with attendant wear and malfunctioning of the injector and valves.

As shown in Figures 2–4, inserts 34 and 40 are cast into the cylinder head in accordance with the invention and serve to isolate the cyclic expansion and contraction of the combustion chamber surface from the critical areas intermediate and adjacent to the injector opening, the valve ports and other openings through the fire deck of the cylinder head. These inserts are of a material or are coated to prevent fusion with the molten metal during the casting process. They are also of limited mass to prevent chilling of the adjacent portions of the casting. It has been found that these inserts can be of either a metal or ceramic-type material having a high fusion temperature or may be of a metal and coated with an oxide, ceramic or metallic material providing such fusion-resisting characteristics. In the illustrative embodiments these inserts are first stamped from rolled sheet steel and are then coated by dipping in a molten aluminum bath which is followed by a diffusion heat treating process in the manner shown and described in the United States Patent 2,569,097. This provides a coating of a highly temperature resistant iron-aluminum compound.

In the illustrative embodiments the inserts 34 and 40 are arranged in pairs in parallel spaced relation flanking the critical areas intermediate and adjacent to the injector and valve port openings thereby serving to isolate the cycle expansion and contraction of the remainder of the combustion chamber surface from these critical areas. The inserts 34 and 40 each have corrugated portions 35 and 41, respectively, normal to and intersecting the surface layer of the fire deck which defines the combustion chamber and is subjected to the cyclic thermal conditions. The corrugations in the inserts extend parallel to the combustion chamber surface and interlock with the adjacent surfaces of the cylinder head. By using such corrugations it has been found that such inserts can be used without increasing the thickness of the fire deck inasmuch as the interlocking serrated surfaces carry the compression and combustion loads imposed on the adjacent portions of the fire deck.

The inserts 34 and 40 are terminated inwardly of the fire deck from their corrugated portions by rounded or cylindrically looped portions. These looped portions are open lengthwise to permit the free flow of molten metal within the loop during the casting process and serve to terminate the "cracks" formed in the head by the use of such inserts. The inserts 34 each have a single looped portion 36 which extends in parallel spaced relation to the combustion chamber surface and intersects the counterbores for the valve seat inserts at its opposite ends. The inserts 40 are each rounded to provide two cylindrical or looped portions 42 and 43 formed at right angles to each other. The looped portion 42 is normal to and intersects the combustion chamber surface at one end and the looped portion 43 extends in parallel spaced relation to the combustion chamber surface and intersects the adjacent valve seat insert counterbore at its end opposite the looped portion 42.

Under normal engine operating conditions, the cyclic expansion of the surface layer of the head adjacent the combustion chamber effects the formation of grooves 37 and 44 immediately adjacent the inserts 34 and 40, respectively. Since the compressive stresses resulting from such cyclic expansion exceeds the yield points of the insert and head materials at the temperatures involved, these grooves are formed in part by the outward extrusion of a portion of the insert and in part by the permanent upsetting of the adjacent surface layer. The grooves 37 and 44 are thus formed during the initial or breaking-in period of engine operation to the depth of this surface layer subjected to cyclic thermal conditions and are adapted to accommodate subsequent expansive and contractive plastic flow of this surface layer without imposing further compressive and tensive stresses on the critical areas of the head intermediate the inserts.

While the illustrative embodiments of the invention show the use of paired inserts in flanking relation to the critical fire deck surfaces, satisfactory results have also been obtained using single inserts bisecting such critical surfaces. In certain engines and particularly those of larger size, additional inserts have also proven advantageous in preventing cylinder head cracking. In certain engines and particularly smaller engines where radial sunburst type cracking from the exhaust port openings is not a problem, inserts in the fire deik transverse to the diametrical plane of the valve axes may not be necessary. Other forms of nonfusible inserts also are contemplated within the scope of the invention and may be highly desirable in certain engines since the design and location of the inserts should be related necessarily to the problems deriving from the cyclic thermal conditions imposed on the surfaces of the various engine members.

A third form of insert 45 is shown in Figure 7. This inset is triangular in shape and particularly designed for use in applications similar to that for which the inserts 40 are used in the above-described embodiment. As shown, the insert 45 has a portion 46 corresponding to the portion 41 of insert 40 and having corrugations intended to provide interlocking surfaces parallel to the combustion chamber surface of the fire deck. A round bead 47 is formed arcuately and diagonally of the corrugations and is adapted to terminate the insert-created "crack"; intersecting the exhaust port at one end and the surface of the combustion chamber at its other end. The insert 45 may be made of a pressure and heat-formed asbestos or other suitable nonmetallic material, as shown, or may be of a suitably coated metallic sheet material similar to that used in the above-described embodiment.

A preferred method of casting and forming a cylinder head to include such inserts is shown in Figures 8, 9 and 10. Referring to Figure 8, the various members of the head mold are formed separately and include a slab 50 of baked core sand which forms the lower half of the head mold. The upper face 52 of this core slab is adapted to mount and reference cores for water, gas and other passages within the head. Such cores for exhaust gas and water passages are indicated at 54 and 55, respectively. A plurality of grooves 56 are formed in the core slab and open on its upper face, being arranged in appropriate patterns with relation to the various core mounting positions. These grooves are beveled, as indicated at 58, adjacent the upper face of the core slab and are adapted to mount the various inserts to be cast into the cylinder head. Prior to their insertion in the mounting grooves, the portion of each insert intended to extend within its mounting groove is coated with a suitable mounting paste. Upon insertion in the groove any excess of this paste which is designated by the reference numeral 60 is retained within the beveled portion of the groove thus preventing any blowhole inclusions of the paste within the head casting proper. This beveled portion of the groove also serves to insure that the molten metal, having convex meniscus characteristics with relation to the nonfusible insert, will not leave any pockets adjacent the inserts within the head casting proper. When the inserts have been mounted in their respective grooves, the various cores are mounted on the slab core in their proper positions. An upper mold half, not shown, is then clamped to the slab core to complete the head mold. After the mold has been assembled, the head 18 is cast by pouring molten metal in the mold. After the casting operation, the mold members are removed in a conventional manner, leaving the resultant head casting as shown in Figure 9. The casting is then cleaned and subsequently machined in the usual manner to the finished fire deck surface and valve seat insert counterbores as shown in Figure 10; the metal removed being indicated by phantom lines. These machining operations, of course, insure that these inserts intersect these finished surfaces of the head.

From the foregoing description it will be obvious to those skilled in the art that various changes might be made in the materials and shapes of the inserts and that the location, spacing and number of inserts utilized might be varied without departing from the spirit of the invention, as defined in the following claims.

I claim:

1. In a member of an internal combustion engine having a surface thereon defining at least a portion of a combustion chamber, said surface being subjected to the cyclic changes of temperatures occurring within said combustion chamber thereby subjecting a layer of said member adjacent said surface to severe cyclic thermal expansive and contractive conditions relative to the remainder of said member, an insert of sheet material non-fusibly cast within said member, said insert intersecting and extending substantially normally from said surface portion through said layer and terminating within said member in spaced relation to said surface, said insert under normal engine operating conditions effecting the formation of grooves adjacent said insert to the depth of said layer by the compressive upsetting of said layer, and said grooves being adapted to accommodate the subsequent expansive and contractive plastic flow of said surface and layer without imposing further compressive expansion and tensive contraction stresses on the portions of said layer adjacent said insert.

2. In a member of an internal combustion engine having a surface thereon defining at least a portion of a combustion chamber and having a passage therein opening on said combustion chamber surface, said surface being subjected to the cyclic changes of temperature occurring within said combustion chamber thereby subjecting a layer of said member adjacent to and including said surface to cyclic thermal expansive and contractive conditions, an insert nonfusibly cast into said member, said insert having a cylindrical portion intersecting said passage at one end and extending therefrom within said member, and a second portion extending from said cylindrical portion and intersecting said passage and said surface, said second portion being adapted under normal operating conditions of said engine to initially effect the formation of grooves adjacent said insert to the depth of said layer, said grooves being adapted to accommodate the subsequent expansive and contractive plastic surface flow of said surface and layer without imposing further compressive expansion and tensive contraction stresses on the portions of said surface and layer adjacent said insert.

3. In a member of an internal combustion engine having a surface thereon defining at least a portion of a combustion chamber and having a passage therein opening on said combustion chamber surface, said surface being subjected to the cyclic changes of temperature occurring within said combustion chamber thereby subjecting a layer of said member adjacent to and including said surface to cyclic thermal expansive and contractive conditions, an insert nonfusibly cast into said member, said insert having a first cylindrical portion intersecting said passage at one end and extending therefrom within said member, a second cylindrical portion intersecting said surface at one end and extending therefrom within said member, and a third portion extending from said cylindrical portions and intersecting said passage and said surface, said third portion being serrated to interlock with the mating surfaces of said member and under normal operating conditions of said engine initially effecting the formation of grooves adjacent said insert to the depth of said layer, said grooves being adapted to accommodate the subsequent expansive and contractive plastic surface flow of said surface and layer without imposing further compressive expansion and tensive contraction stresses on the portions of said surface and layer adjacent said insert.

4. In a member of an internal combustion engine having a surface thereon defining at least a portion of a combustion chamber and having at least two valve controlled passages therein opening on said combustion chamber surface in spaced relation, said surface being subjected to the cyclic changes of temperature occurring within said combustion chamber thereby subjecting a layer of said member adjacent to and including said surface to cyclic thermal expansive and contractive conditions, an insert nonfusibly cast into said member intermediate said passages, said insert having a cylindrical portion intersecting and extending between said passages within said member in spaced relation to said surface and layer, and a second portion extending from said cylindrical portion through said layer and intersecting said passages and said surface, said second portion being serrated to interlock with the mating surfaces of said member and under normal operating conditions of said engine effecting the formation of grooves adjacent said insert to the depth of said layer, said grooves being adapted to accommodate the subsequent expansive and contractive plastic surface flow of said surface and layer without imposing further compressive expansion and tensive contraction stresses on the portions of said surface and layer adjacent said insert.

5. In a member of an internal combustion engine having a surface thereon defining at least a portion of a combustion chamber and having at least two valve controlled passages therein opening on said combustion chamber surface in spaced relation, said surface being subjected to the cyclic changes of temperature occurring within said combustion chamber thereby subjecting a layer of said member adjacent to and including said surface to cyclic thermal expansive and contractive conditions, at least two inserts nonfusibly cast into said member and extending in spaced relation intermediate said passages, each of said inserts having a cylindrical portion intersecting and extending between said passages within said member in spaced relation to said surface and layer and a second portion extending from said cylindrical portion through said layer and intersecting said passages and said surface, said second portions being serrated to interlock with the mating surfaces of said member and under normal operating conditions of said engine effecting the formation of grooves adjacent said inserts to the depth of said layer, said grooves being adapted to accommodate the subsequent expansive and contractive plastic surface flow of said surface and layer without imposing further compressive expansive and tensive contraction stresses on the portions of said surface and layer intermediate and adjacent said inserts.

6. In a member of an internal combustion engine having a surface thereon defining at least a portion of a combustion chamber, having two valve controlled passages therein opening on said combustion chamber surface in spaced relation to each other and having a relatively smaller opening therein intermediate said passage openings, said surface being subjected to the cyclic changes of temperature occurring within said combustion chamber thereby subjecting a layer of said member adjacent to and including said surface to cyclic thermal expansive and contractive conditions: two inserts nonfusibly cast into said member in spaced relation to said intermediate openings and extending in parallel relation to each other between said passages, each of said inserts having a cylindrical portion intersecting and extending between said passages within said member in spaced relation to said surface and layer and a second portion extending from said cylindrical portion through said layer and intersecting said passages and said surface, said second portions being serrated to interlock with the mating surfaces of said member and under normal operating conditions of said engine effecting the formation of grooves adjacent said insert to the depth of said layer, said grooves being adapted to accommodate the subsequent expansive and contractive plastic surface flow of said surface and layer without imposing further compressive expansion and tensive contraction stresses on the portions of said surface and layer intermediate adjacent said inserts.

7. In a member of an internal combustion engine as defined in claim 6, a plurality of secondary inserts nonfusibly cast into said member, said secondary inserts being arranged in groups of at least two and extending in parallel spaced relation to each other from said passage openings transversely of a diametrical plane common to said passage openings, each of said secondary inserts having a first cylindrical portion intersecting and extending within said member from the adjacent passage in spaced relation to said surface and layer, a second cylindrical portion intersecting and extending within said member from said surface in spaced relation to the adjacent passage opening, and a third portion extending from said cylindrical portions through said layer and intersecting said adjacent passage and said surface, said third portions being serrated to interlock with the mating surfaces of said member and under normal operating conditions of said engine effecting the formation of grooves adjacent said insert to the depth of said layer, said grooves being adapted to accommodate the subsequent expansive and contractive plastic surface flow of said surface and layer without imposing further compressive expansion and tensive contraction stresses on the portions of said surface and layer intermediate and adjacent said secondary inserts.

8. In a member of an internal combustion engine having a surface thereon defining at least a portion of a combustion chamber and having a plurality of valve controlled passages opening on said combustion chamber surface in spaced relation to each other, said surface being subjected to the cyclic changes of temperature occurring within said combustion chamber thereby subjecting a layer of said member adjacent to and including said surface to cyclic thermal expansive and contractive conditions, at least one insert nonfusibly cast into the portions of said member intermediate adjacent passages, each of said inserts intersecting the adjacent passages and said surface and extending through said layer and terminating within said member in spaced relation to said surface and layer, and each of said inserts being adapted to effect the formation of grooves adjacent said insert to the depth of said layer under normal operating conditions of said engine, said grooves being adapted to accommodate the subsequent expansive and contractive plastic surface flow of said surface and layer without imposing further compressive expansion and tensive contraction stresses on the portions of said surface and layer adjacent said insert.

9. In a member of an internal combustion engine as defined in claim 8, a plurality of secondary inserts nonfusibly cast into said member, said secondary inserts being paired and extending from opposite sides of said passage openings transversely of a diametrical plane common to said passage openings, each of said secondary inserts intersecting and extending within said member from said surface and the adjacent passage and terminating within said member in spaced relation to said surface and layer, said secondary inserts being adapted to effect the formation of grooves adjacent said insert to a depth of said layer under normal operating conditions of said engine, said grooves being adapted to accommodate the subsequent expansive and contractive plastic surface flow of said surface and layer without imposing further compressive expansion and tensive contaction stresses on the portions of said surface and layer adjacent said secondary insert.

10. An insert adapted to be cast into a member of an internal combustion engine having a limited surface portion thereon defining at least a portion of a combustion chamber for said engine, said surface being subjected to the rapid and extreme cyclic changes of temperature occurring within said combustion chamber thereby subjecting said surface portion to severe cyclic thermal expansive and contractive conditions relative to the remainder of said member, said insert being of a sheet material nonfusible with the metal of said member during the casting process and dimensioned to intersect and extend within said member substantially normally to said surface portion and to terminate in spaced relation to said surface portion within said member, said insert being adapted under normal operating conditions of said engine to effect the formation of grooves adjacent said insert to the depth of said surface portion by the compressive upsetting of said surface portion, said grooves being adapted to accommodate subsequent expansive and contractive plastic flow of said surface portion without imposing further compressive expansion and tensive contraction stresses on said surface portion adjacent said insert.

11. In a member of a thermal device having a limited surface thereon adapted to be subjected to rapid and extreme cyclic changes of surface temperature thereby subjecting a layer of said member adjacent to and including said surface to severe cyclic thermal expansive and contractive conditions, an insert cast into said member, said insert being nonfusible with said member during the casting process and having a cylindrical terminal portion within said member and a second portion extending from said cylindrical portion and intersecting said limited surface.

12. In a member of a thermal device having a limited surface portion thereon subjected to rapid and extreme cyclic changes of surface temperature thereby subjecting said surface portion to severe cyclic thermal expansive and contractive conditions relative to the interior and other surface portions of said member, said interior and other surface portions being maintained under substantially steady state thermal conditions, an insert of sheet material nonfusibly cast within said member, said insert intersecting and extending substantially normally to said surface portion and terminating within said member in spaced relation to said surface portion, said insert effecting the formation of grooves adjacent said insert to the depth of said surface portion under normal operating conditions of said device by the compressive upsetting of said surface portion, and said grooves being adapted to accommodate the subsequent expansive and contractive plastic flow of said surface portion without imposing further compressive expansion and tensive contraction stresses on said surface portion adjacent said insert.

13. A member of a thermal device having a limited surface thereon adapted to be subjected to rapid and extreme cyclic changes of surface temperature thereby subjecting a layer of said member adjacent to and including said surface to cyclic thermal expansive and contractive conditions and including an insert cast into said member, said insert being of sheet material nonfusible with the metal of said member during the casting process and having a cylindrical portion extending in spaced relation to said surface within said member and a second portion extending from said cylindrical portion and intersecting said limited surface, said second portion being corrugated parallel to said surface to provide interlocking serrations with said member and being adapted under normal operating conditions of said thermal device to initially effect the formation of grooves adjacent said insert to the depth of said layer, said grooves being adapted to accommodate the subsequent expansive and contractive plastic surface flow of said layer without imposing further compressive expansion and tensive contraction stresses on the adjacent portions of said surface layer.

14. An insert adapted to be cast into a member of a thermal device having a limited surface portion thereon adapted to be subjected to rapid and extreme cyclic changes of surface temperature thereby subjecting said surface portion to severe cyclic thermal expansive and contractive conditions relative to the interior and other surface portions of said member, said interior and said other surface portions being maintained under substantially steady state thermal conditions, said insert being of a sheet material nonfusible with the metal of said member during the casting process and having a cylindrical portion adapted to extend in paralleled spaced relation to said limited surface portion within said member, and said insert having a second portion extending from said cylindrical portion and adapted to intersect said limited surface portion, said second portion being serrated to provide interlocking surfaces with the mating surfaces of said member, said insert being adapted under normal operating conditions of said thermal device to effect the formation of grooves intermediate said insert and the said surface portion of said member to the depth of said surface portion, said grooves being adapted to accommodate the expansive and contractive plastic surface flow of said surface portion resulting from said rapid and extreme cyclic changes of surface temperature without imposing further compressive expansion and tensive contraction stresses on said surface portion.

15. An insert adapted to be cast into a member of a thermal device having a limited surface portion thereon subjected to rapid and extreme cyclic changes of surface temperature thereby subjecting said surface portion to severe cyclic thermal expansive and contractive conditions relative to the interior and other surface portions of said member, said interior and other surface portions being maintained under substantially steady state thermal conditions, said insert being of sheet material nonfusible with the metal of said member during the casting process and adapted to extend within said member substantially normally from said surface portion and terminating in spaced relation to said surface portion, and said insert being adapted under normal operating conditions of said device to effect the formation of grooves adjacent said insert to the depth of said surface portion by the compressive upsetting of said surface portion.

16. An insert to be case into a member of a thermal device having a limited surface thereon adapted to be subject to rapid and extreme cyclic changes of surface temperature thereby subjecting a layer of said member adjacent to and including said surface to severe cyclic thermal expansive and contractive conditions, said insert being of a material nonfusible with the metal of said member during the casting process and comprising a cylindrical portion and a second portion extending from said cylindrical portion and adapted to intersect said surface.

17. An insert as set forth in claim 16 being formed of a sheet material and said second portion being corrugated to provide interlocking serrated surfaces with said member.

References Cited in the file of this patent

UNITED STATES PATENTS

| | | |
|---|---|---|
| 1,524,391 | Durham | Jan. 27, 1925 |
| 1,865,299 | Berry | June 28, 1932 |
| 1,871,586 | Cobb | Aug. 16, 1932 |
| 1,929,780 | Hager | Oct. 10, 1933 |
| 1,958,004 | Jehle | May 8, 1934 |
| 1,989,996 | Mautsch | Feb. 5, 1935 |
| 2,170,103 | Westover | Aug. 22, 1939 |
| 2,750,641 | Raible | June 19, 1956 |

UNITED STATES PATENT OFFICE

CERTIFICATE OF CORRECTION

Patent No. 2,893,371                                                July 7, 1959

Vernon Schafer, Jr.

It is hereby certified that error appears in the printed specification of the above numbered patent requiring correction and that the said Letters Patent should read as corrected below.

Column 2, line 10, for "form or" read -- form of --; column 3, line 69, for "fire deik" read -- fire deck --; column 4, line 4, for "inset is" read -- insert is --; column 6, line 29, claim 5, for "expansive" read -- expansion --; column 7, line 48, for "contaction" read -- contraction --; column 9, line 21, claim 16, for "case" read -- cast --.

Signed and sealed this 8th day of December 1959.

(SEAL)
Attest:

KARL H. AXLINE
Attesting Officer

ROBERT C. WATSON
Commissioner of Patents